Dec. 30, 1930.                F. R. QUICK                1,786,779
                          CONVEYER MECHANISM
                          Filed April 17, 1929
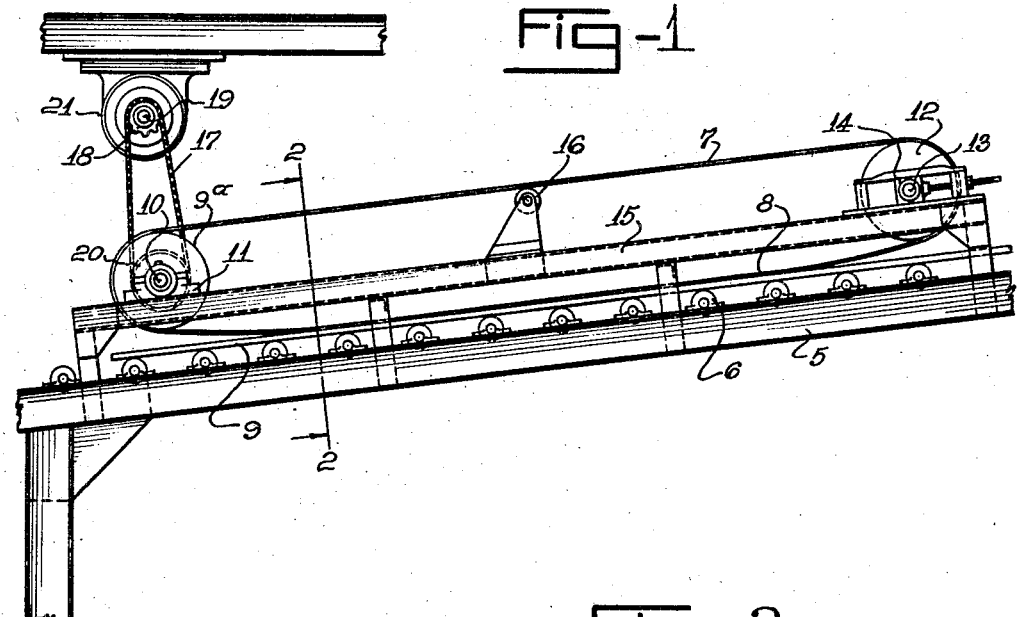
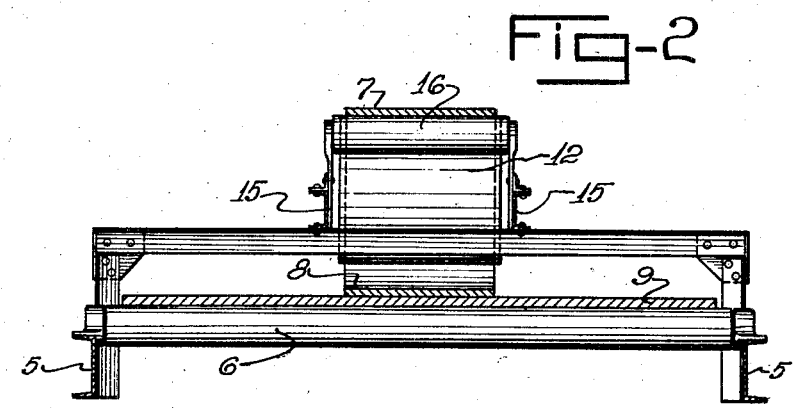
INVENTOR
FLOYD R. QUICK.
BY
L.A.Paley
ATTORNEY Patented Dec. 30, 1930

1,786,779

UNITED STATES PATENT OFFICE

FLOYD R. QUICK, OF FORT DODGE, IOWA, ASSIGNOR TO UNITED STATES GYPSUM COMPANY, OF CHICAGO, ILLINOIS, A CORPORATION OF ILLINOIS

CONVEYER MECHANISM

Application filed April 17, 1929. Serial No. 355,690.

This invention relates to conveyer mechanism and has reference more particularly to a conveyer mechanism using a combination of a belt and rollers.

An object of this invention is to provide a device for insuring the positive travel of objects along a roller conveyer; also to improve conveyer mechanisms in other respects hereinafter specified and claimed.

Reference is to be had to the accompanying drawings forming a part of this specification, in which Fig 1 is a side elevation of my improved conveyer mechanism, and Fig. 2 is a sectional elevation through the mechanism taken on the line 2—2 of Fig. 1.

In the manufacture of plaster board, or other sheet material, it is customary to pass the sheets along a roller conveyer 5 having idler rollers 6 rotatably mounted thereon. This conveyer 5 is usually set at a slight inclination to the horizontal and gravity is depended upon to cause the sheet material to move along said conveyer. However, in some cases because of structural difficulty or limited space, the angle of the conveyer to the horizontal is so slight that some times the sheet material, or other objects, stop on the roller conveyer and cease their movement there-along.

A salient feature of my invention consists in the provision of a conveyer belt 7 having a lower reach 8, said conveyer belt being mounted above the roller conveyer 5 so that the lower reach 8 normally rests upon the rollers 6 with the sheets to be conveyed, such as plaster board 9, extending between said lower reach and the rollers 6. The belt conveyer 7 is rotatably mounted upon a drive pulley 9 secured to a shaft 10, the latter being rotatably mounted in suitable bearings 11. The opposite end of said belt conveyer 7 is supported by an idler pulley 12 mounted upon a shaft 13, the latter being rotatably supported in take-up bearings 14. The bearings 11 and 14 are rigidly secured to suitable framework 15. Intermediate rollers 16 are rotatably mounted so as to support the upper reach of the conveyer belt 7. The shaft 10 is positively driven by means of a chain 17 connecting a sprocket 18 on a speed reducer shaft 19 to a sprocket 20 secured to the shaft 10. The speed reducer shaft 19 is connected to a motor 21 in the usual way. Any other suitable driving means or speed reducing gearing may be used if desired, the main object being to cause the continuous positive movement of the conveyer belt 7. Thus the lower reach 8 of the conveyer belt 7 makes frictional contact with the plaster boards 9 and causes them to move along the roller conveyer 5 with a positive movement so that no stopping of the plaster board or other object takes place. In fact the roller conveyer 15 may extend exactly horizontally and still the objects will move there-along with a positive movement due to the frictional contact with the lower reach 8 of the belt.

I would state in conclusion that while the foregoing description represents a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. In a conveyer mechanism for plaster boards, a roller conveyer having rotatably mounted idler rollers associated therewith, and a positively driven endless conveyer belt mounted above said roller conveyer, one reach of said endless conveyer being adapted to make frictional contact with articles on the rollers due solely to the weight of said reach, so as to cause the positive movement of said articles along said roller conveyer.

2. In a conveyer mechanism, a roller conveyer having rotatably mounted idler rollers associated therewith, and means associated with said rollers adapted to make frictional contact with the tops of said articles on said rollers so as to cause the positive movement of said articles along said roller conveyer.

3. In a conveyer mechanism, a roller conveyer positioned at a slight angle to the horizontal, idler rollers rotatably mounted upon said conveyer, and a second endless conveyer mounted above said rollers and adapted to frictionally engage the tops of articles on said rollers so as to cause the positive movement of said articles along said roller conveyer.

4. In a conveyer mechanism for plaster boards, a roller conveyer having rotatably mounted idler rollers associated therewith, a plurality of rotatably mounted shafts positioned above said roller conveyer, a belt conveyer adapted to move along a continuous path about said shafts, one of said shafts being positively driven so as to cause the positive movement of the belt conveyer, said belt conveyer having one reach adapted to frictionally engage the tops of articles on said rollers so as to cause the positive movement of said articles along said roller conveyer due solely to the weight of said belt reach.

FLOYD R. QUICK.